United States Patent [19]

Phaneuf et al.

[11] Patent Number: 4,470,049
[45] Date of Patent: Sep. 4, 1984

[54] TRANSMITTER RECEIVER OPERATING AT 94 GHZ

[75] Inventors: Robert A. Phaneuf, Chelmsford; Isaac E. Kliger, Lexington, both of Mass.

[73] Assignee: Raytheon Company, Lexington, Mass.

[21] Appl. No.: 356,696

[22] Filed: Mar. 3, 1982

[51] Int. Cl.³ .............................................. G01S 7/28
[52] U.S. Cl. ......................... 343/17.1 R; 343/5 DD; 343/16 M
[58] Field of Search .......... 343/5 DD, 5 TM, 17.1 R, 343/5 AF, 5 HM, 7 PL, 5 SW; 455/73, 75, 76, 78, 82, 83; 331/2, 18, 25, 26, 46, 47

[56] References Cited

U.S. PATENT DOCUMENTS 4,097,823 6/1978 Jerinic et al.
4,194,151 3/1980 Gregersen et al. .................. 455/76

OTHER PUBLICATIONS

David N. McQuiddy, Jr.; *Frequency Stability Requirements for a 95 GHz Instrumentation Radar System;* Proc. 35 Ann. Freq. Control Symposium, USAE RADCOM, Ft. Monmouth, N.J. 07703, May 1981, See Especially pp. 520–521, "System Signal Generation".

Primary Examiner—T. H. Tubbesing
Assistant Examiner—Gilberto Barron, Jr.
Attorney, Agent, or Firm—Philip J. McFarland; Joseph D. Pannone

[57] ABSTRACT

A solid state transmitter/receiver operating at 94 GHz is shown to comprise an injection-locked pulsed oscillator for transmitting interrogating pulses and a first local oscillator for heterodyning with received signals to produce an intermediate frequency (I.F.) signal, both such oscillators being phase-locked to a master oscillator operating at a frequency below 94 GHz.

1 Claim, 1 Drawing Figure

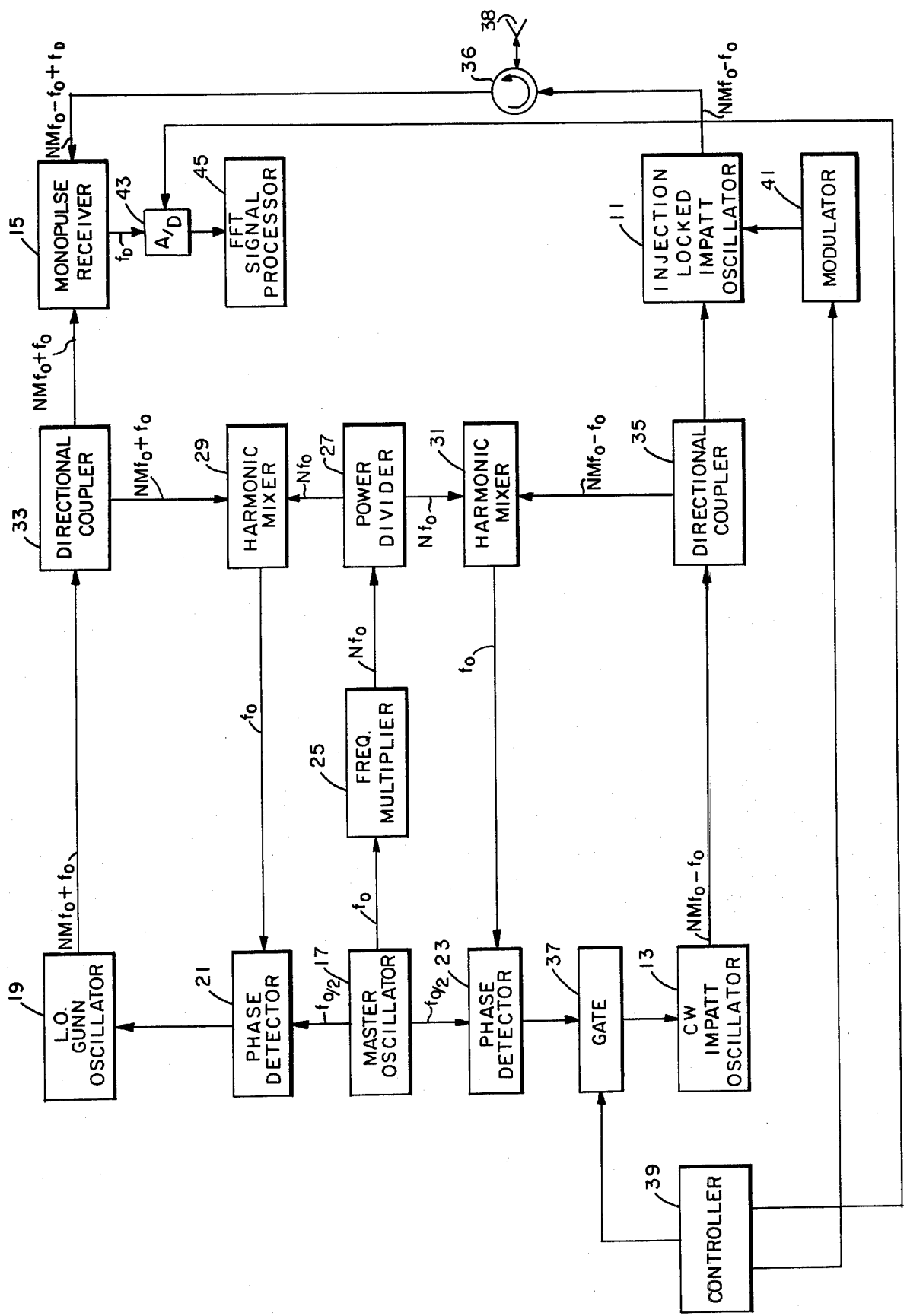

TRANSMITTER RECEIVER OPERATING AT 94 GHZ

BACKGROUND OF THE INVENTION

This invention pertains generally to pulse transmitters and receivers for radio frequency signals and particularly to such apparatus used at frequencies about 90 GHz.

Within the past few years improvements in solid state devices have made it feasible to exploit the window in the radio frequency spectrum at 94 GHz. Thus, intensive efforts have recently been undertaken to develop radar systems operating at 94 GHz for use where size is at a premium, as in guided projectiles or sub-munitions. In such an application, relatively small and light elements such as antennas and feeds may be utilized to achieve angular measurement capabilities which approach the capability of optical systems.

Unfortunately, however, the development of an active radar for use at 94 GHz has been hindered by the lack of adequate transmit-receive switches. Such a lack, in turn, has led heretofore to the requirement that separate antennas be provided for the transmitter and receiver. Such a requirement is, obviously, extremely detrimental when the system is to be used in a guided missile.

In addition, as is well known in the art, if a pulse Doppler radar is desired, the first local oscillator in the receiver must be arranged to maintain a known offset in frequency from the frequency of each transmitted pulse. That is to say, coherency between transmitted and received signals must be maintained to allow Doppler shifts to be determined.

SUMMARY OF THE INVENTION

With the foregoing background of the invention in mind, it is a primary object of this invention to provide an active radar for use at 94 GHz, such radar using a single antenna for transmitting and receiving.

Another object of this invention is to maintain coherency between transmitted and received signals in a pulse Doppler radar operating at 94 GHz.

The foregoing and other objects of this invention are attained generally by providing, in an active pulse radar using a single antenna for transmission and reception, a master oscillator controlling a first local oscillator in the receiver of such radar and an injection-locked pulsed oscillator in the transmitter. The requisite coherency of the first local oscillator and the injection-locked pulse oscillator is maintained by incorporating each such oscillator in a phase-lock loop so that the frequency of each is controlled by the master oscillator.

BRIEF DESCRIPTION OF THE DRAWINGS

For a more complete understanding of this invention, reference is now made to the single FIGURE of the drawings which shows, in block form, a preferred arrangement of the relevant elements in a pulse radar according to this invention.

DESCRIPTION OF THE PREFERRED EMBODIMENT

By way of background, an existing solid state oscillator operating at 94 GHz does not possess the required degree of coherence for use in a pulse Doppler radar. Thus, in such an application, a coherent pulse Doppler waveform is normally generated by injection-locking an IMPATT oscillator to a coherent continuous wave (CW) signal. Unfortunately, however, only single stage IMPATT oscillators are available for use at 94 GHz. Therefore, in order to realize high power at the output of such a device (injection locked IMPATT oscillator 11, shown in the FIGURE), the power out of a CW IMPATT oscillator 13 must be in the order of 15 dB to 20 dB below the peak power of the injection locked IMPATT oscillator 11. Again, unfortunately, there is no known structure operating at 94 GHz that is as effective in isolating a receiver from the transmitter as any conventional "Transmit-Receive" switches operating at a lower frequency. In order then to isolate the monopulse receiver 15 shown in the FIGURE from the relatively high power out of CW IMPATT oscillator 13, that oscillator is turned "OFF" during most of each "receive" period. As IMPATT diodes are very sensitive to changes in temperature, any phase-locked loop (PLL) controlling the CW IMPATT oscillator 13 must, to avoid unacceptable changes in frequency, compensate for cyclical temperature change that occurs each time such an oscillator is turned "ON" or "OFF." When the pulse repetition frequency (PRF) of a system is high (say 25 KHz), the PLL must allow coherent relocking of the CW IMPATT oscillator 13 at such a rate.

A master oscillator 17 controls the frequencies of both a GUNN oscillator 19, that here generates the first local oscillator signal for the monopulse receiver 15, and the CW IMPATT oscillator 13. The latter is here a crystal-controlled oscillator operating at a frequency, $f_o$, of 104.166 MHz. The master oscillator 17 provides reference signals to a pair of phase detectors 21, 23, as well as an input to a frequency multiplier 25 that provides a signal at $Nf_o$ (here N=60). Preferably the phase detectors 21, 23 are similar to those described in the application entitled "Phase-Lock Loop Control Circuitry" filed contemporaneously herewith and assigned to the same assignee as this invention. Briefly, such type of phase detector is operative to produce a correction signal that, when applied to an oscillator (here L.O. GUNN oscillator 19 or CW IMPATT oscillator 13), effectively locks (at the appropriate frequency) each oscillator to the master oscillator 17 to produce a desired I.F. frequency signal during reception. The output signal from such multiplier, which here is at a frequency of 6.250 GHz, is passed to a power divider 27 wherein it is split and applied as a reference (local oscillator) signal to a pair of conventional harmonic mixers 29, 31 where the 15th harmonic (93.750 Ghz) is compared with the second input. The second input signal to harmonic mixer 29, which is here at a frequency of $(NMf_o+f_o)$, is obtained from the GUNN oscillator 19 via a directional coupler 33 (in this case M=15). The harmonic mixer 29 is effective to downconvert the $(NMf_o+f_o)$ input signal to provide an output signal at the $f_o$ frequency that is passed as the second input signal to the phase detector 21. The error output signal from the phase detector 21 is provided as a frequency control input signal to the GUNN oscillator 19 and serves to close a PLL (not numbered) which will act to degenerate the internal phase noise of the GUNN oscillator 19.

The second input signal to the harmonic mixer 31 is at a frequency of $(NMf_o-f_o)$ and is obtained from the CW IMPATT oscillator 13 via a directional coupler 35. The harmonic mixer 31 is effective to downconvert the $(NMf_o-f_o)$ input signal to provide an output signal at frequency $f_o$ that is applied to the phase detector 23. The error output signal from the latter is provided, via a gate 37, as a frequency control signal to the CW IMPATT oscillator 13. The PLL (not numbered) just described is effective to control the frequency of the CW IMPATT oscillator 13 as well as to degenerate the internal phase noise of the latter. The PLL's (not numbered) are also effective to maintain a fixed frequency separation of $2f_o$ or 208.332 MHz between the GUNN oscillator 19 and the CW IMPATT oscillator 13.

As mentioned briefly hereinabove, in order to obtain the requisite peak power output from the injection-locked IMPATT oscillator 11, the power output from the CW IMPATT oscillator 13 should be on the order of 120 milliwatts. To prevent feedthrough during reception of a signal of such a level to receiver 15 (through a circulator 36), the CW IMPATT oscillator 13 is turned OFF immediately after each pulse from injection-locked IMPATT oscillator 11 is transmitted. Prior to transmission of the next pulse, a controller 39 enables the gate 37, thereby turning "ON" the CW IMPATT oscillator 13 (approximately 200 nanoseconds before the pulse is to be transmitted) so that that oscillator may be phase-locked with the master oscillator 17 before the next transmitted pulse is generated. The controller 39 also activates the modulator 41 approximately 140 nanoseconds after the gate 37 is enabled, thereby producing a transmitted pulse from the injection-locked IMPATT oscillator 11 that is phase-locked to the output signal from the CW IMPATT oscillator 13 during the last 60 nanoseconds of such output signal. The transmitted pulse is passed (through circulator 36) to an antenna 38.

Within the monopulse receiver 15 the radar return signals are downconverted to a first I.F. frequency of 208.332 MHz ($2f_o$) and are then quadrature demodulated to form I and Q baseband signals that are digitized in analog-to-digital converter 43 to form contiguous range gates. The range gated data are then FFT'd in signal processor 45 in a conventional way.

Having described a preferred embodiment of this invention, it will now be apparent to one of skill in the art that the described arrangement may be changed without departing from the concepts of the invention. It is felt, therefore, that this invention should not be restricted to its disclosed embodiment, but rather should be limited only by the spirit and scope of the appended claims.

What is claimed is:

1. In a pulse transmitter/receiver for operation in the 94 GHz band with a predetermined offset between the frequency of each transmitted pulse and the frequency of a local oscillator, the improvement comprising:
   (a) a crystal-controlled oscillator operating to produce a master signal at a frequency $f_o/2$, such frequency being below the 94 GHz band;
   (b) frequency multiplying means, responsive to the master signal, to multiply such signal by a factor N to produce a fixed signal in the "X" band;
   (c) voltage-tunable local oscillator means, nominally operating at a frequency $(NM+1)f_o$, where M is a multiplier equal to 94/N;
   (d) IMPATT oscillator means, nominally operating at a frequency $(NM-1)f_o$;
   (e) first harmonic mixer means, responsive to a first part of the fixed signal out of the frequency multiplier means and to a first part of the signal out of the voltage-tunable local oscillator means, to produce a first control signal nominally at a frequency $f_o$;
   (f) first phase detector means, responsive to the master signal and to the first control signal, to produce a correction signal for the voltage-tunable local oscillator to adjust the frequency thereof to exactly $(NM+1)f_o$;
   (g) second harmonic mixer means, responsive to a second part of the fixed signal out of the frequency multiplier means and a first part of the signal out of the IMPATT oscillator means to produce a second control signal nominally at a frequency $f_o$;
   (h) second phase detector means, responsive to the master signal and to the second control signal, to produce a correction signal for the IMPATT oscillator means to adjust the frequency thereof to exactly $(NM-1)f_o$;
   (i) power oscillator means, injection-locked to a second part of the signal out of the IMPATT oscillator means, to produce a signal for transmission;
   (j) gating means, disposed between the second phase detector means and the IMPATT oscillator means, for periodically actuating the IMPATT oscillator means;
   (k) modulator means for periodically actuating the power oscillator means; and
   (l) controller means for synchronously enabling the gating means and the modulator means to produce pulses of radio frequency energy out of the power oscillator means, such pulses being at a frequency $(NM-1)f_o$.

* * * * *